Dec. 20, 1960    P. E. FORSTER ET AL    2,965,208
MULTI-STATION LIVE SPINDLE INDEXING MACHINE
Filed Aug. 29, 1957    3 Sheets-Sheet 1

INVENTORS
PETER E. FORSTER &
ANTON E. PIRMAN
BY
Oberlin & Limbach
ATTORNEYS.

Dec. 20, 1960
P. E. FORSTER ET AL
2,965,208
MULTI-STATION LIVE SPINDLE INDEXING MACHINE
Filed Aug. 29, 1957
3 Sheets-Sheet 2
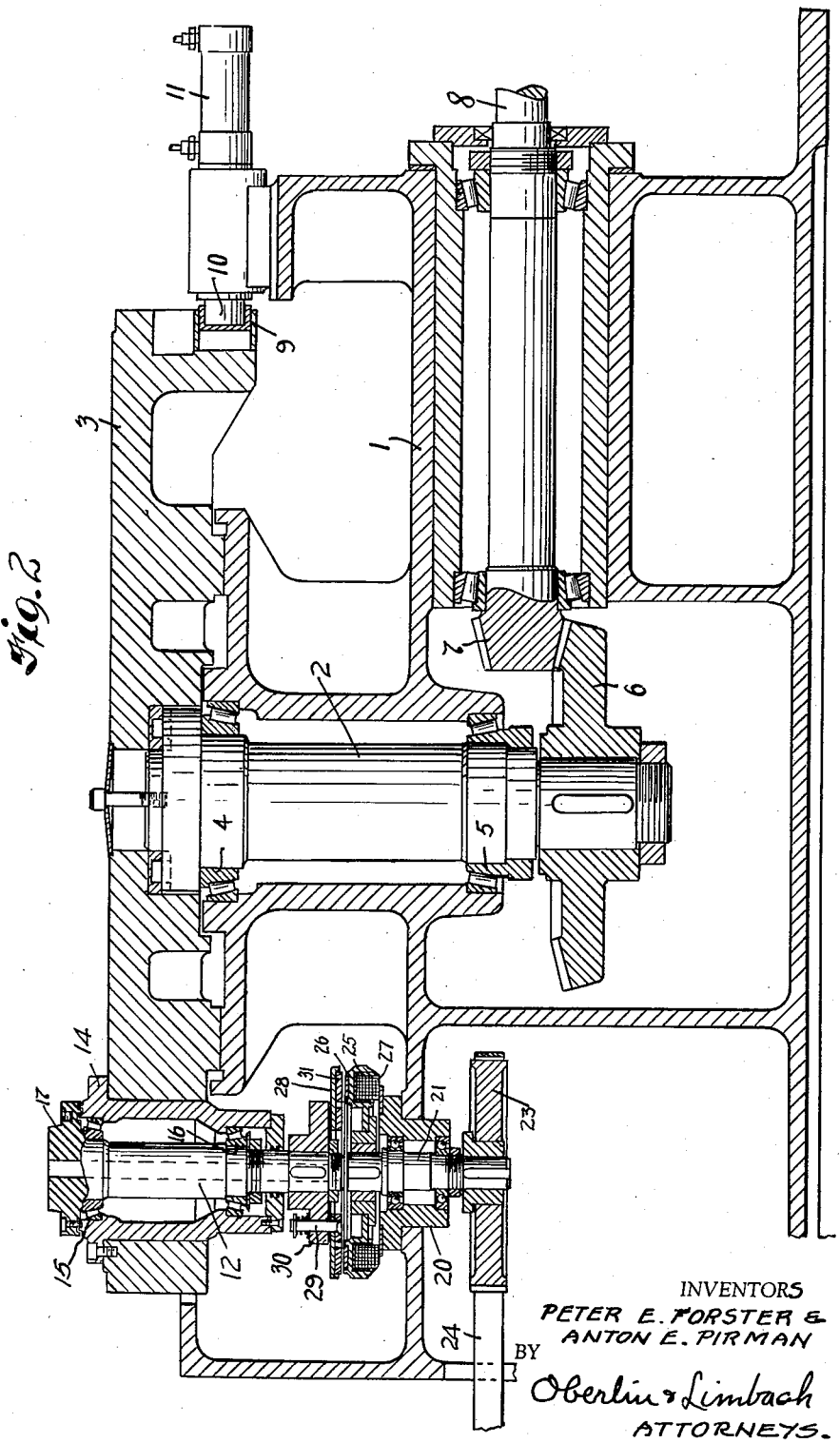
INVENTORS
PETER E. FORSTER &
ANTON E. PIRMAN
BY
Oberlin & Limbach
ATTORNEYS.

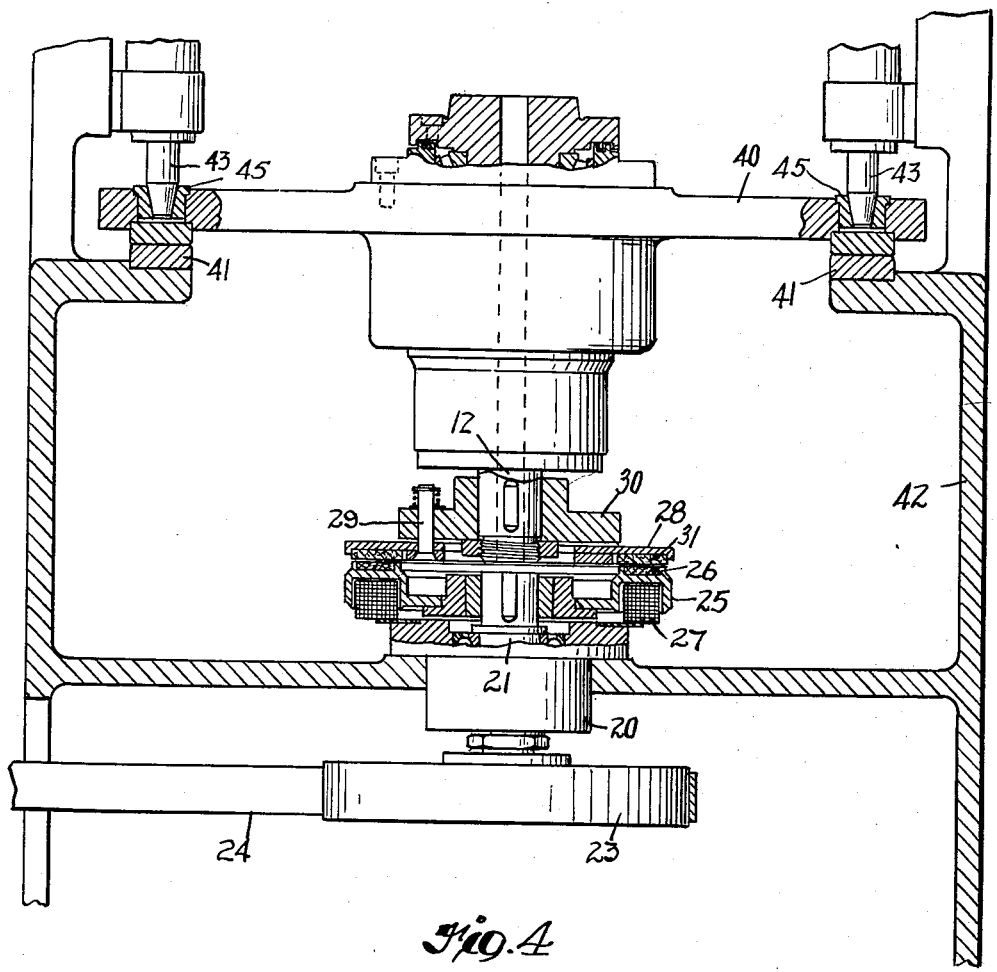

United States Patent Office 2,965,208
Patented Dec. 20, 1960

2,965,208

MULTI-STATION LIVE SPINDLE INDEXING MACHINE

Peter E. Forster, Cleveland, and Anton E. Pirman, Euclid, Ohio, assignors to The Motch & Merryweather Machinery Company, Euclid, Ohio, a corporation of Ohio Filed Aug. 29, 1957, Ser. No. 680,990

9 Claims. (Cl. 192—142)

The present invention relates generally as indicated to a multi-station live spindle indexing machine and, more particularly, to an indexing machine of the type which is provided with a series of work stations to which workpieces are indexed successively for performance of machining operations thereon.

Hitherto, it has been proposed in such multi-station indexing machines to provide pulleys and clutches at those work stations at which it is desired to drive the workpiece carrying spindles of the indexing machine, the several pulleys being driven as by a single electric motor and an endless belt which has only a small degree of wrap around each of said pulleys. In these machines the torque that may be transmitted to the respective spindles is somewhat limited due to the small amount of wrap of the belt about the respective pulleys, and moreover, the speeds of the individual spindles can be changed only by changing the pulleys (or gearing) thereof because a change in belt speed correspondingly changes the speeds of all of the spindles.

Likewise, in these multi-station machines the loading station and usually one or more of the work stations where milling or other operations are to be performed while the workpieces are held stationary each has a brake associated therewith. As apparent, the clutches, and the brakes, and their actuating mechanisms greatly add to the machine cost.

Accordingly, it is a principal object of this invention to provide a multi-station indexing machine which employs magnetic clutches and brakes thereby eliminating the need for a complex and expensive arrangement of clutch and brake actuating yokes or levers for driving and braking the spindles at the successive stations.

It is another object of this invention to provide a multi-station indexing machine which has individual electric drive motors at those work stations at which the spindles are to be driven, thereby enabling the driving of the spindles at the proper speeds and with sufficient torque so as to efficiently perform the machining operations.

It is another object of this invention to provide a versatile multi-station indexing machine in which any of the series of work stations may be converted readily from one at which the spindle indexed is driven to one at which the spindle is held against rotation or vice versa.

It is still another object of this invention to provide a multi-station indexing machine in which all of the spindles are identical irrespective of whether they are to be driven or not at the successive work stations and loading station, the magnetic elements on the respective spindles serving in one instance to couple the spindles to magnetic clutch elements on the drive shafts and in the other instance to cooperate with magnetic brake elements.

It is another object of this invention to provide a multi-station indexing machine in which a series of spindles are circularly arranged and journalled on a table, the latter being rotatably indexed to advance the spindles successively to the series of circularly arranged work stations and loading station.

It is still another object of this invention to provide a multi-station indexing machine in which a series of spindles are lineally indexed successively to work stations arranged in a line, the spindles preferably being journalled on individual fixtures which, at the conclusion of the machining operations on the respective workpieces, are returned from the end of the line back to the beginning for repetition of the operations upon new workpieces loaded onto the spindles.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

Fig. 2 is a cross-section view on somewhat enlarged scale taken substantially along the line 2—2, Fig. 1;

Figure 3:
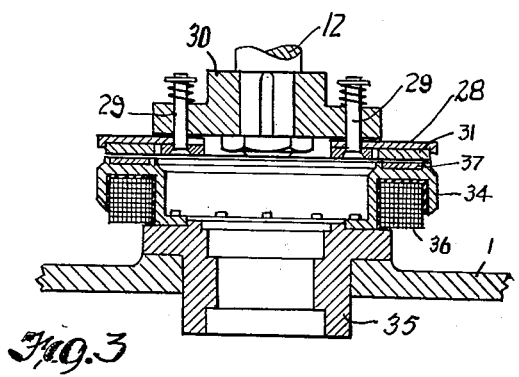

Fig. 3 is a fragmentary cross-section view taken at the loading station or at one of the work stations at which it is desired to hold the spindle against rotation; and Fig. 4 is a transverse cross-section view in a vertical plane of a modified form of multi-station indexing machine in which a series of spindle mounting fixtures are arranged to be lineally advanced or indexed successively to work stations arranged in a line.

Figure 1:
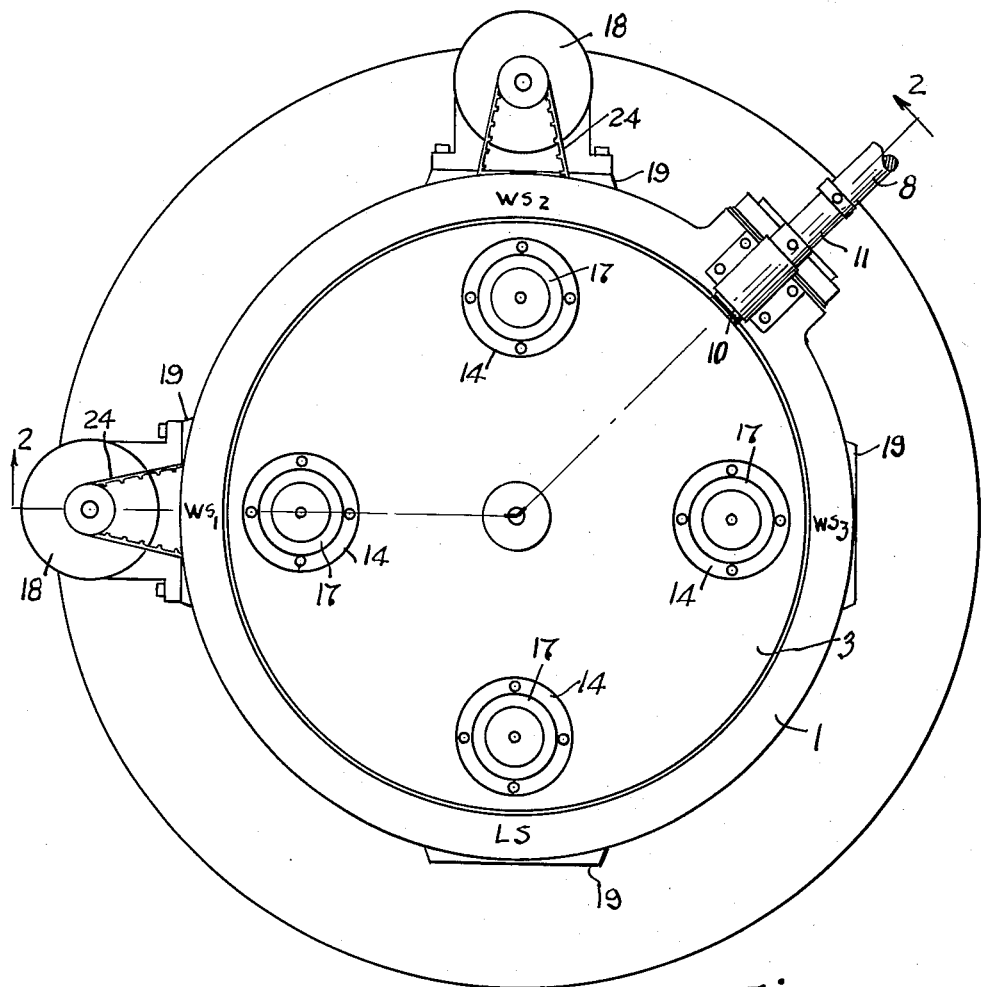
Fig. 1 is a top plan view of one embodiment of the present invention in which workpiece mounting spindles are journalled on a table, the table being rotatably indexed to position the spindles successively at several work stations and at the loading station.

Referring now in detail to the drawings and first to the form of the indexing machine illustrated in Figs. 1 to 3, the same comprises a circular base 1 in which the downwardly extending central shaft 2 of the table 3 is journalled as in tapered roller bearings 4 and 5, the table 3 being rotated as by means of the bevel gear 6 that is keyed onto the lower end of the shaft 2 and that meshes with the bevel pinion 7 of the drive shaft 8.

Uniformly spaced about the periphery of the table 2 are a series of radially extending recesses 9 (herein four) into which the inner end of a radially movable locking plunger 10 is moved at each indexed position to positively and accurately lock the table 2. The locking plunger 10 is moved radially inward to such locking position and radially outward to unlocking position as by means of the pneumatic cylinder 11. If desired, the opposite sides of the locking plunger 10 may be of wedge-shape so as to eliminate rotary looseness when the table 2 is at any of its several indexed positions.

In the present case the table 3 is provided with four circularly arranged and equally spaced spindle housings 14 in each of which a spindle 12 is journalled as by tapered roller bearings 15 and 16. The upper end of each spindle 12 is provided with a chuck mounting flange 17. No workpiece holding chuck has been shown, but as evident to persons skilled in the art, any conventional chuck may be mounted on the flange 17.

The indexing machine herein is provided with a loading station LS and three successive work stations WS1, WS2 and WS3, of which the work stations WS1 and WS2 have associated therewith separate electric drive motors 18 which, in a manner presently to be explained, are operative to drive the spindles 12 that are indexed to the stations WS1 and WS2. The other work station WS3 and the loading station LS1 are arranged so that the spindles 12, when indexed to those stations, are held against rotation by brakes. The holding of the spindles 12 against rotation when indexed to the loading station LS facilitate unloading and loading of workpieces, and, in the case of the work station WS3, the operation to be performed on the successive workpieces at that station is such that no rotation is required. It is to be noted that each station is provided with a boss 19 for the mounting of the separate electric drive motors 18, whereby it is a simple matter to arrange for rotation or nonrotation of any or all of the spindles 12.

As best shown in Fig. 2 at each of the stations at which it is desired to drive the spindle 12 there is provided a housing 20 in which a shaft 21 is journalled, the lower end of each shaft 21 having mounted thereon a pulley 23 over which is trained the belt 24 driven by the associated electric drive motor 18. Keyed on the upper end of each shaft 21 is an iron ring 25 which carries an upper friction facing 26 and which is recessed to embrace the stationary coil 27 which is mounted on the housing 20. Thus, when the coil 27 is energized the iron ring 25 is magnetized to draw downwardly the iron ring 28 which is nonrotatably mounted on the lower end of each spindle 12 by means of spring-loaded pins 29 secured to said iron ring 28 and axially slidably fitted in the carrier 30 that is keyed onto the lower end of each spindle 12. The ring 28 carries a friction facing 31 for engagement with the friction facing 26 on the driving ring 25. When the table 2 is in an indexed position and when the coil 27 is energized, the spindles 12 then at the work stations WS1 and WS2 will be driven by reason of the engagement of the friction facings 26 and 31. In the preferred embodiment of the machine the belts 24 are so-called "cog" belts and the pulleys 23 are cog wheels having teeth engaged with the teeth of the belt.

In the case of the stations at which the spindles 12 are to be held against rotation, namely, the loading station LS and the work station WS3 as herein shown, the only essential difference is that the iron ring 34 (see Fig. 3) is bolted to the housing 35, which housing in turn is bolted to the base 1 of the machine. Thus, when the stationary coil 36 is energized the iron ring 28 of the spindle 12 at that indexed position will be drawn downwardly to bring its friction facing 31 into engagement with the friction facing 37 on said fixed iron ring 34, whereby the spindle 12 will be held against rotation.

Referring now to Fig. 4, which shows an in-line arrangement wherein the several work stations are arranged in a row, each spindle 12 with its magnetic ring 28 is journalled in a traveling fixture 40 which is guided for lineal movement along the guides 41 of the base 42 of said machine. The respective traveling fixtures 40 are indexed at the successive work stations by means of locking plungers 43 which, when moved downwardly, make wedged engagement within tapered bushings 45 mounted in the flanges of said fixtures 40; the fixtures thereby being solidly held at the respective work stations with the spindle axes accurately located with respect to the metal-working machine head disposed thereabove.

As shown in Fig. 4, the spindles 12 are adapted to be driven by individual electric drive motors at selected work stations through the pulley 23 and belt 24 and magnetic drive element 25 which parts are the same as previously described in relation to Figs. 1 and 2. Here again, at those stations at which it is desired to hold the spindles 12 against rotation magnetic brakes, as shown in Fig. 3, will be employed.

From the foregoing it can be seen that we have provided a simple and efficient form of multi-station live spindle indexing machine, the spindles 12 being accurately indexed to the several stations and being solidly held thereat by locking plungers 10 and 43. It has not been deemed necessary to herein illustrate any of the heads of the metal-working machines that are circularly arranged, or lineally arranged above the spindles 12 at the series of work stations. Obviously, the metal-working machine heads may be grinding heads, milling heads, turning heads, etc. and when of a type requiring rotation of the workpiece, that station will be equipped with the individual electric drive motor 18 and magnetic clutch (Figs. 2 and 4) and when of a type requiring that the workpiece be held against rotation, that station will be equipped with a magnetic brake as shown in Fig. 3.

In any event, we have provided a unique form of indexing machine which is versatile in that the sequence of machining operations on a workpiece may be readily changed and at those stations at which the spindles and workpieces are to be driven, the electric drive motors 18 and drive pulleys 23 may be selected to transmit the required horsepower and speed to the spindles 12. In this way the spindles 12 may be driven at the optimum speeds for greatest efficiency in the performance of the respective operations.

The machines herein disclosed may be operated in a variety of ways, for instance, if desired, the individual drive motors 18 may be continuously operated and the coils 27 may be energized simultaneously as by means of a limit switch only after the table 2 reaches an indexed position in which event, it will not be necessary to slide the friction facings 26 and 31 or 37 and 31 with respect to each other as the spindles 12 move to and away from an indexed position. Similarly, if desired, the individual drive motors 18 may be energized by a limit switch that is closed only at the time that the table reaches an indexed position. Irrespective of which mode of operation is chosen, it is not necessary to provide in the present machine any special forms of clutch or brake lever or to engage and disengage gears or the like to selectively drive the spindles or to hold the spindles against rotation at the series of work stations and at the loading station.

Other modes of applying the principle of the invention may be employed, change being made as regards the details described, provided the features stated in any of the following claims, or the equivalent of such, be employed.

We therefore particularly point out and distinctly claim as our invention:

1. An indexing machine comprising a base providing a series of work stations; a spindle carrier guided on said base for indexing movement from one station to the next; a spindle journalled on said carrier and adapted to mount a work piece for performance of machining operations thereon at said work stations; individual separately powered motor driven members supported on said base at a plurality of said stations and coaxial with said spindle when indexed to that station; and cooperating magnetic clutch elements on said spindle and on said motor driven members effective to drive said spindle when said carrier is indexed to those stations that are equipped with said motor driven members, the magnetic clutch elements on said motor driven members being axially and rotatably fixed thereto for rotation in unison therewith, and the magnetic clutch element of said spindle being axially movably, but nonrotatably, mounted on said spindle for attraction into frictional rotary driving engagement with the magnetic clutch elements on said motor driven members.

2. The indexing machine of claim 1 wherein a magnetic brake is fixedly mounted at least at one other station effective to attract the axially movable magnetic element of said spindle to hold the latter against rotation when said carrier is indexed to said one other station.

3. An indexing machine comprising a base providing a loading station and a series of work stations at which it is desired to perform machining operations on work pieces that are successively indexed from one work station to the next; a series of spindles on which work pieces are mounted when the latter are indexed successively to said loading station; indexing means rotatably supporting said spindles and movably guided by said base for indexing of said spindles from said loading station to the successive work stations; individual separately powered motor driven members at certain of the work stations and coaxial with said spindles when indexed to that station; cooperating magnetic clutch elements on each spindle and on each of said motor driven members effective to drive those spindles that are indexed to the work stations equipped with said motor driven members; a magnetic brake at least at one other work station effective to cooperate with the magnetic elements of said spindles to hold the latter against rotation when indexed to said one other work station, the magnetic clutch elements on said motor driven members being axially and rotatably fixed thereto for rotation in unison therewith, the magnetic clutch elements on said spindles being axially movably, but nonrotatably, mounted thereto for attraction into frictional rotary driving engagement with the magnetic clutch elements on said motor driven members, and the magnetic brake including a magnetic element fixed to said base against rotation and axial movement.

4. The indexing machine of claim 3 wherein a similar magnetic brake including a fixed magnetic element is provided at said loading station to similarly hold the spindles stationary when indexed to said loading station.

5. The indexing machine of claim 3 wherein said indexing means comprises a table rotatably supported by said base, and wherein said loading and work stations and said spindles are circularly arranged on said base and table respectively.

6. The indexing machine of claim 3 wherein said indexing means comprises a series of spindle carrying fixtures longitudinally slide-guided by said base, and wherein said loading and work stations are arranged in a line along said base.

7. An indexing machine comprising a series of work stations; a series of spindles upon which work pieces are adapted to be mounted; means for successively indexing said spindles to the respective stations for performance of working operations on such work pieces; at least two rotating drive elements each at different work stations, magnetic clutch means on said drive elements for coupling said drive elements to the successive spindles thereby to provide a live spindle at each said different work station, and separately powered drive means for each said drive element whereby the spindles at said different work stations can each be driven at a predetermined speed and torque.

8. An indexing machine as set forth in claim 7 including a loading station, magnetic brake means at said loading station, said magnetic brake means being effective to hold said spindles against rotation when at said loading station.

9. An indexing machine as set forth in claim 8 wherein said magnetic brake means and said rotating drive elements are coaxially aligned with the spindles successively indexed to the respective work stations.

References Cited in the file of this patent

UNITED STATES PATENTS

| | | |
|---|---|---|
| 1,765,670 | Herr | June 24, 1930 |
| 2,086,847 | Bullard et al. | July 13, 1937 |
| 2,330,968 | Groene et al. | Oct. 5, 1943 |
| 2,531,890 | Pearson | Nov. 28, 1950 |
| 2,564,613 | Seborg et al. | Aug. 14, 1951 |
| 2,600,667 | Mason | June 17, 1952 |
| 2,633,777 | Hoern | Apr. 7, 1953 |
| 2,745,167 | Cross | May 15, 1956 |